(No Model.)
W. D. BARTLETT.
CHIMNEY CAP OR VENTILATOR.
No. 272,517. Patented Feb. 20, 1883.
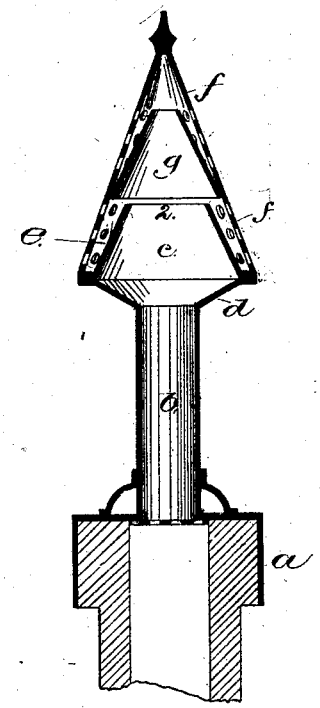
Witnesses.
Fred A. Powell
George Stoeckel.
Inventor:
William D. Bartlett
by Crosby & Gregory
Attys.

UNITED STATES PATENT OFFICE.

WILLIAM D. BARTLETT, OF AMESBURY, MASSACHUSETTS.

CHIMNEY CAP OR VENTILATOR.

SPECIFICATION forming part of Letters Patent No. 272,517, dated February 20, 1883.

Application filed October 28, 1882. (No model.)

*To all whom it may concern:*

Be it known that I, WILLIAM DEARBORN BARTLETT, of Amesbury, county of Essex, and State of Massachusetts, have invented an Improvement in Chimney Caps or Ventilators, of which the following description, in connection with the accompanying drawing, is a specification.

My invention relates to an improved ventilator or chimney-cap, and has for its object to insure a perfect draft under all atmospheric conditions.

Much trouble is encountered in windy weather from currents of air passing down the chimney, and thus causing smoke or gas to be blown into the room, instead of having the proper draft or current of air upward through the chimney to combine with the fuel.

My invention is embodied in a chimney-cap so constructed that a gust of wind in any direction, either lateral or upward or downward, will tend to produce a vacuum in the chimney, and thus cause a draft for removing the air from the interior of the flue. The said chimney-cap consists, essentially, of a shaft forming a continuation of the flue, and having at its upper end a chamber, shown in this instance as composed of two flaring or conical walls united base to base, the upper one being open at the top and forming a jet, so that a current of air striking against it in a horizontal direction or in an upward direction tends to produce a vacuum upon the well-known physical principle that is illustrated by an atomizer or ejecting apparatus for rarefying air or producing a vacuum. The said chamber has its upper portion inclosed in a conical perforated housing, having its base connected with the common base of the flaring walls of the said chamber. The said perforated housing serves to a certain extent to break up the air-currents, reducing their violence before striking against the walls or passing across the top of the chamber, and the said housing is provided with a cap or diaphragm, also conical in shape, placed above the opening of the chamber in such manner that a downward current of air is carried by the sides of the opening or outlet of the chamber instead of entering it, and thus tends to rarefy the air or produce a vacuum in the chimney, instead of blowing or passing as a current directly down the chimney, as takes place when the downward gust or current of air strikes the top of the chimney-flue not provided with a cap. The upper portion of the housing is preferably not provided with perforations, it becoming heated, and thus tending to produce upward currents from the chimney-flue.

The drawing shows in vertical section a chimney-cap embodying this invention.

The base *a* is of suitable form to fit upon the top of the chimney, and sustains a shaft, *b*, forming a continuation of the chimney-flue, and having at its upper end the chamber *c*, the under side, *d*, of which inclines upward and outward, and the upper side, *e*, upward and inward, thus forming a cone or jet for the passage of the heated air and gases rising through the chimney-flue. The said chamber is provided with an external casing or housing, *f*, shown as a cone steeper than the one *c*, forming the upper part of the chamber *c*, and rising from the base of the said cone *c*, or point of conjunction of the base of the walls *e e* of the chamber *c*, the upper portion of which it incloses. The said casing *f* is provided with perforations for the escape of the smoke and gases arising from the chimney, the said perforations also permitting portions of external air-currents to enter the casing and strike upon the upper surface *e* of the chamber *c*. The walls of the said casing, however, greatly reduce the violence of the said air-currents, which, if striking the outer surface of the said cone *e*, either in a horizontal or upward direction, would pass across its discharge-opening 2, tending to produce a vacuum in the chamber *c*, and thus produce an upward current in the chimney in the well-known manner.

In order to prevent currents of air from striking downward into the outlet 2 of the chamber *c*, the housing *f* is provided with a conical diaphragm, *g*, the base of which is connected with the housing near the outlet-passage 2 of the chamber. The said diaphragm thus conveys any air-currents which enter the casing or housing *f* in a downward direction along the outside of the chamber *c*, not permitting the said current to enter the outlet-passage 2 thereof, and the said downward current also tends to produce a vacuum in the said chamber *c*.

The chimney-cap is round, so that the wind has the same effect when striking it from all sides, and it will be seen that upward or downward or lateral currents of air or gusts of wind all tend to produce a vacuum in the chimney-flue, and thus increase the upward draft, there being under no circumstances a downward current produced in the flue.

There are no loose or movable parts, so that the cap is entirely noiseless in operation, and it, moreover, arrests the movement of sparks for a sufficient time to cause them to be extinguished.

I claim—

1. The combination of the chamber $c$, composed of flaring walls placed base to base, and having an outlet-passage in the upper wall, with the perforated housing $f$, inclosing the upper portion of the said chamber, and having its base connected with the common base of the said flaring walls, substantially as described.

2. The combination of the shaft and chamber at the end thereof, having a tapering or conical outlet, with the perforated conical housing inclosing the said outlet, and the conical cap or diaphragm in the said housing over the said outlet, substantially as and for the purpose set forth.

In testimony whereof I have signed my name to this specification in the presence of two subscribing witnesses.

WILLIAM DEARBORN BARTLETT.

Witnesses:
   JOS. P. LIVERMORE,
   BERNICE J. NOYES.